United States Patent [19]

Gunesin et al.

[11] Patent Number: 4,503,187

[45] Date of Patent: Mar. 5, 1985

[54] P-METHYLSTYRENE COPOLYMER BLENDS

[75] Inventors: Binnur Z. Gunesin, Warren; Alex W. Kawczak, Plainsboro, both of N.J.

[73] Assignee: Mobil Oil Corporation, New York, N.Y.

[21] Appl. No.: 558,233

[22] Filed: Dec. 5, 1983

[51] Int. Cl.$^3$ .................. C08L 53/02; C08L 23/06; C08L 25/16

[52] U.S. Cl. .................... 525/71; 525/86; 525/98; 525/240

[58] Field of Search .................. 525/98, 70, 71

[56] References Cited

U.S. PATENT DOCUMENTS

| | | | |
|---|---|---|---|
| 2,694,692 | 11/1954 | Amos et al. | 260/45.5 |
| 3,894,117 | 7/1975 | Agouri et al. | 525/98 |
| 3,959,239 | 5/1976 | Butter et al. | 526/25 |
| 4,031,166 | 6/1977 | Bronstert et al. | 260/876 B |
| 4,086,287 | 4/1978 | Kaeding et al. | 260/671 |
| 4,188,432 | 2/1980 | Holden et al. | 428/35 |
| 4,255,531 | 3/1981 | Arbit | 525/237 |
| 4,260,694 | 4/1981 | Schwab | 525/314 |
| 4,275,179 | 6/1981 | Sherman | 525/98 |
| 4,306,049 | 12/1981 | Prapas | 526/347 |
| 4,352,908 | 10/1982 | Murray | 525/98 |
| 4,386,187 | 5/1983 | Grancio et al. | 525/96 |
| 4,397,988 | 8/1983 | Sherman | 525/98 |

FOREIGN PATENT DOCUMENTS 1054301 1/1967 United Kingdom .

OTHER PUBLICATIONS

Paul–"Compatibilizers for Polymer Blends" 1978, pp. 35-37 & 50-52.
G. A. Cook, *Survey of Modern Industrial Chemistry*, Ann Arbor Science Publishers, Inc., 1975 pp. 252-254.
P. Wiseman, *An Introduction to Industrial Organic Chemistry*, John Wiley & Sons, 1976, pp. 288-289, 306.

*Primary Examiner*—Carman J. Seccuro
*Attorney, Agent, or Firm*—Alexander J. McKillop; Michael G. Gilman; Charles J. Speciale

[57] ABSTRACT

This invention provides a high molecular weight copolymer blend of polyethylene and poly(para-methylstyrene) or high impact poly(p-methylstyrene) in the presence of a hydrogenated compatibilizing agent, such as a hydrogenated butadiene diblock.

19 Claims, No Drawings

4,503,187

P-METHYLSTYRENE COPOLYMER BLENDS

FIELD OF THE INVENTION

The present invention is directed to blends of polyethylene and poly(para-methylstyrene), hereinafter referred to as poly(p-methylstyrene), in the presence of a compatibilizing agent, and particularly to blends of polyethylene and poly(p-methylstyrene) in the presence of a poly(p-methylstyrene)-hydrogenated butadiene diblock.

DESCRIPTION OF PRIOR ART

Blending poly(p-methylstyrene) with other polymers is known to the art. For example, it has previously been disclosed to blend poly(p-methylstyrene) and polystyrene with conjugated polydienes (U.S. Pat. No. 4,352,908), a conjugated diene, such as isoprene or butadiene (U.S. Pat. Nos. 4,260,694 and 4,397,988), or a styrene-conjugated diolefin block copolymer such as styrene-butadiene-styrene (U.S. Pat. No. 4,275,179). The above-mentioned references are incorporated herein by reference.

However, blends of poly(p-methylstyrene) and polyethylene in accordance with the present invention have not been successful primarily because they are incompatible together. It has now been discovered that uniform mixtures or blends of polyethylene and poly(p-methylstyrene) may be formed by using hydrogenated diblock polymers as a compatibilizing agent. The two portions of the admixture will be linked together by an elastomeric hydrogenated polybutadiene block.

SUMMARY OF THE INVENTION

The present invention provides a high molecular weight blend produced by blending polyethylene and poly(p-methylstyrene) in the presence of a hydrogenated compatibilizing agent. The present invention further provides a method of making the abovedescribed blend, the method including the steps of blending polyethylene and the compatibilizing agent at temperatures in the range of 150° and 200° C., and then blending in poly(p-methylstyrene) at temperatures in the range of 175°–270° C. The components of the blend may be blended simultaneously. However, it is preferred to first blend polyethylene and the compatibilizing agent and then blend the poly(p-methylstyrene) into the polyethylenecompatibilizing agent mixture.

DETAILED DESCRIPTION OF THE INVENTION

An essential monomer component in preparing the polymers used in this invention is p-methylstyrene. It is within the contemplation of this invention to use mixtures of methylstyrene isomers rich in p-methylstyrene. Such mixtures contain at least 90 weight percent, preferably 95 weight percent, and more preferably 97 or greater weight percent, p-methylstyrene and less than 0.1 weight percent o-methylstyrene, with the balance being m-methylstyrene. A typical mixture contains, by weight, about 97 percent p-methylstyrene, about 3 percent m-methylstyrene and about 0.05 percent o-methylstyrene. The mixtures are obtained by catalytic dehydrogenation of the mixtures of ethylmethyl benzene isomers, described in U.S. Pat. No. 4,086,287 which is incorporated herein by reference. Homopolymers and copolymers prepared from p-methylstyrene are prepared in the known manner, utilizing methods analogous to those long used for the preparation of polystyrene and styrene copolymers. The preparation of poly(p-methylstyrene) polymers and random copolymers of styrene and p-methylstyrene is described in U.S. Pat. No. 4,306,049, which is incorporated herein by reference. Useful comonomers include acrylic monomers, particularly acrylonitrile, acrylic acid and methacrylic acid esters, such as methyl methacrylate.

Another favored class of copolymers are the high impact copolymers. These are generally graft copolymers, produced by grafting units derived from the polymerizable mixture onto a backbone polymer which is generally of a rubbery nature. Suitable backbone polymers include polybutadiene, poly(dimethyl butadiene), polyisoprene, polychloroprene and other synthetic rubbers, such as the styrene-butadiene rubbers (SBR), ethylenepropylene-diene elastomers (EPR), polyacrylates, nitrile rubbers and copolymers with other aromatic monomers, including vinyl toluene. The backbone will generally comprise 2 to 25 percent by weight of the high impact copolymer, preferably 3 to 10 percent by weight. Normal techniques, e.g., grafting, comparable to those used for making high impact polystyrenes, are useful; they are well known in the art and referred to, for example, in U.S. Pat. No. 2,694,692 and British Patent No. 1054301.

The other blend component necessary for the production of the polymers in this invention is polyethylene. Polyethylene is well known in the art and is commercially available in bulk. Generally, polyethylene is divided into two classes: high density and low density. The density depends upon the degree of linearity and crystallinity of the polymer. High-density polyethylene is mostly linear and crystalline, and the low-density polyethylene is about half-branched and much less crystalline. More complete descriptions of polyethylene may be found in Cook, G. A., *Survey of Modern Industrial Chemistry*, Ann Arbor Science Publishers, Inc., 1975, pp. 252–254, and Wiseman, P., *An Introduction to Industrial Organic Chemistry*, John Wiley & Sons, 1976, pp. 288–289, 306, both of which are incorporated herein by reference.

It is within the scope of this invention to use a variety of forms of polyethylene, including low density polyethylene (LDPE), linear low density polyethylene (LLDPE), and high density polyethylene (HDPE).

The hydrogenated dienes employed in the block copolymer compatibilizing agent preferably have from 4–8 carbon atoms per molecule and still more preferably from 4–5 carbon atoms. Thus, the preferred species are butadiene and isoprene, although methylisoprene and other conjugated dienes may be utilized, as well as mixtures thereof. Representative compatibilizing agents are hydrogenated derivatives of poly(p-methylstyrene)-polybutadiene, poly(p-methylstyrene)-polyisoprene, poly(styrene)-polybutadiene, and poly(styrene)-polyisoprene. The molecular weight of the block copolymers vary from 90,000 to 200,000.

The hydrogenated materials may be hydrogenated to any desired extent, although the substantially complete hydrogenation of at least the conjugated diene polymer block is desirable. The hydrogenation process may be carried out according to the methods disclosed in U.S. Pat. No. 3,959,239, herein incorporated by reference. It is desired to reduce the original unsaturation of the block copolymer by at least about 50% and preferably by at least about 90%. The reasons for hydrogenation are broadly twofold, in that hydrogenation increases the stability of the product and raises the softening point as well.

The block copolymer generally will contain between about 25 weight percent to about 75 weight percent poly(p-methylstyrne) and 25 to 75 weight percent conjugated diene. The diene content of the block copolymer may vary outside these ranges, but it is preferred that the diene content be selected so that the block copolymer is hard and resinous, as opposed to rubbery, as occurs with high diene content.

The hydrogenated block copolymer compatibilizing agents are known materials which are commercially available. The general configuration of the block copolymer compatibilizing agents is

A-B wherein A is a polymer block of styrene and B is a polymer block of the hydrogenated derivative of the diene to be employed in the invention. A representative styrene-butadiene diblock copolymer is available from Shell Chemical Company under the trade name Shellviz-40.

Additionally, the other compatibilizing agent was prepared by grafting p-methylstyrene onto polyethylene in the presence of a suitable solvent, such as ethylbenzene. The resultant mixture was then grafted onto the polyethylene in the presence of suitable high or low temperature initiators, which are well known in the art. In general, the term "low temperature initiator" refers to one with a half-life of about 1 to 2 hours at 85° C. Examples include benzoyl peroxide, acetyl peroxide, t-butyl peroxyisobutyrate, p-chlorobenzoyl peroxide, 2,5-dimethyl-2,5 bis(2-ethyl hexanoylperoxy)hexane, and t-butyl peroctoate. A "high temperature initiator" is one which has a half-life of from about 0.3 to 3 hours at 130° C. Examples include t-butyl perbenzoate, t-butyl peracetate, di-t-butyl peroxyphthalate, dicumyl peroxide, alpha, alpha, bis(t-butyl peroxy)diisopropyl benzene and t-butyl peroxy(2-methylbenzoate).

In general, the low temperature initiator is present in a weight amount which is equal to or in excess of the high temperature initiator. For example, ratios of low temperature to high temperature initiators in the range of 1:1 to 5:1 can be used. More preferably the ratio falls within the range of about 1:1 to 3:1.

The weight percent ratio of the blend can be varied. Generally the blend of the instant invention will contain poly(p-methylstyrene) at a level from 50 to 90 percent by weight, polyethylene from 10 to 50 percent by weight, and the compatibilizing agent from 2 to 10 percent by weight, preferably 2 to 5 percent by weight.

Blending of the polymers is accomplished by procedures well known in the art, including mixing the polymers in a Brabender mixer, extruder or in a 2-roll differential speed mixer. The blend temperature for polyethylene falls within the range of 150° to 200° C., preferably 160° C., and for poly(p-methylstyrene) within the range of 175° to 270° C., preferably 200° C. Although poly(p-methylstyrene), polyethylene and the compatibilizing agent may be blended simultaneously, it is preferred to pre-blend polyethylene and the compatibilizing agent for 5 to 15 minutes and then add poly(p-methylstyrene). This latter method enhances the "adhesive" properties between the polyethylene and poly(p-methylstyrene), thus creating greater interfacial adhesion of polymers. At temperatures in the vicinity of 160° C., polyethylene sheets very well and forms a clear film.

Finally, poly(p-methylstyrene) is added to the blend. As the viscosity of the blend increases with the addition of the poly(p-methylstyrene), it is advantageous to increase the blending temperature to preferably 200° C. As the poly(p-methylstyrene) is compatible with the styrene-diblock compatibilizing agent, the normally incompatible phases of polyethylene and poly(p-methylstyrene) will successfully interlock after blending for approximately 5 to 30 minutes, generally 10 minutes.

It is also within the scope of this invention to use graft polymers, mentioned above, as the compatibilizing agent.

The blends of the present invention exhibit high impact strength and heat distortion properties. In general, the blends of the present invention will also have increased impact strength over blends of poly(p-methylstyrene) and polyethylene which lack a compatibilizing agent.

The blends are particularly suited for applications in which high impact polystyrene and high impact poly(p-methylstyrene) is used. Representative examples for the product formed in the present invention include dairy product containers, detergent and oil containers, and refrigerator liners.

The following examples are given in order that the invention may be more fully understood. Proportions and percentages are given by weight. The properties of the resulting polymers were tested under the conditions of the American Standard Test Method (ASTM).

EXAMPLE 1

Preparation of a Control Polymer Blend From a 50/50 Mixture of Poly(p-methylstyrene) (PPMS) and LLDPE The polymer in Example 1 had the following composition (weight percent):
PPMS (PMX-H20A)—50
LLDPE (GP-2)—50
LLDPE was melted and sheeted in a roll mill at a temperature of 160° C. for approximately 5 minutes. At this point, the LLDPE was characterized by excellent sheeting tendencies on the rollers and a transparent appearance. PPMS was then blended with the LLDPE at a temperature of 200° C. for a period of time of about 10 minutes. The product blend was then removed from the roll mill, cooled to room temperature and pelletized.

The properites of the resultant blend were as follows:
Izod Notched ⅛" Impact (ft lb/in)—0.94
Tensile Strength (psi)—3,390
Yield Strength (psi)—3,550
Elongation (%)—9.7
Tensile Modulus (psi)—173,000

EXAMPLE 2

Preparation of PPMS-LLDPE Blend With 5% Styrene-hydrogenated Butadiene Block Copolymer Compatibilizing Agent The blend in Example 2 had the following composition (weight percent):
PPMS—47.5
LLDPE—47.5
Compatibilizing Agent (Shellviz-40)—5.0
This blend was prepared using the same method of Example 1, with the exception that the compatibilizing agent (molecular weight 120,000, styrene content 30% by weight) was blended with LLDPE for 5 minutes prior to the addition of PPMS. The final mixture was blended together for 10 minutes.

The properties of the final blend were as follows:
Izod Notched ⅛" Impact (ft lb/in)—5.1
Tensile Strength (psi)—3,300
Yield Strength (psi)—3,470
Elongation (%)—9.7
Tensile Modulus (psi)—170,000

EXAMPLE 3

Preparation of PPMS-LLDPE-Compatibilizing Agent Blend

The blend in Example 3 had the following composition (weight percent):
PPMS—45
LLDPE—45
Compatibilizing Agent—10

This blend was prepared using the same method and the same monomers employed in Example 2, but different weight percents. The properties of the final blend were as follows:
Izod Notched ⅛" Impact (ft lb/in)—7.61
Tensile Strength (psi)—2,850
Yield Strength (psi)—2,850
Elongation (%)—9.6
Tensile Modulus (psi)—140,000

EXAMPLE 4

Preparation of High Impact Poly(p-methylstyrene) (HIPPMS) and LLDPE Blend

The blend in Example 4 had the following composition (weight percent):
HIPPMS (PMXR35B)—90
LLDPE—10

The mixture was prepared using the same method employed in Example 1. The properties of the final blend were as follows:
Izod Notched ⅛" Impact (ft lb/in)—0.971
Tensile Strength (psi)—3,600
Yield Strength (psi)—3,200
Elongation (%)—25
Tensile Modulus (psi)—204,000

EXAMPLE 5

Preparation of Blend From Mixture of HIPPMS, LLDPE, and Compatibilizing Agent

The blend in Example 5 had the following composition (weight percent):
HIPPMS—85
LLDPE—10
Compatibilizing Agent—5

The blend of Example 5 was prepared using the same method employed in Example 2. The compatibilizing agent was the same in Example 2.

The properties of the final blend were as follows:
Izod Notched ⅛" Impact (ft lb/in)—4.45
Tensile Strength (psi)—3,520
Yield Strength (psi)—3,370
Elongation (%)—25.1
Tensile Modulus (psi)—198,000

The following Examples were designed to compare the different characteristics of polymers in which polystyrene has been substituted for PPMS. The tests were run simultaneously under the same conditions.

EXAMPLE 6

Preparation of Control Blend From PPMS-LLDPE-Compatibilizing Agent

The blend of Example 6 had the following composition (weight percent):
PPMS—47.5
LLDPE—47.5
Compatibilizing Agent—5.0

The blend of Example 6 was prepared using the same method employed in Example 2. The properties of the resulting polymer blend were as follows:
Izod Notched ⅛" Impact (ft lb/in)—2.54
Gardner Impact (ft/lb)—160
Tensile Strength (psi)—2,850
Yield Strength (psi)—2,850
Elongation (%)—14.6

EXAMPLE 7

Preparation of Blend From Mixture of Polystyrene, LLDPE, and Compatibilizing Agent The blend of Example 7 had the following composition (weight percent):
Polystyrene—47.5
LLDPE—47.5
Compatibilizing Agent—5

The blend of Example 7 was prepared using the same method employed in Example 2. The properties of the final blend were as follows:
Izod Notched ⅛" Impact (ft lb/in)—1.70
Gardner Impact (ft/lb)—108
Tensile Strength (psi)—2,420
Yield Strength (psi)—2,370
Elongation (%)—6.6

Although the present invention has been described with preferred embodiments, it is to be understood that modifications and variations may be resorted to, without departing from the spirit and scope of this invention, as those skilled in the art will readily understand.

We claim:

1. A high molecular weight blend comprising in combination from 10 to 50 percent by weight polyethylene, from 50 to 90 percent by weight poly(para-methylstyrene) and from 2 to 10 percent by weight of a hydrogenated diene diblock compatibilizing agent.

2. The blend according to claim 1, wherein said polyethylene is selected from the group consisting of low density polyethylene, linear low density polyethylene, and high density polyethylene.

3. The blend according to claim 1, wherein said poly(para-methylstyrene) is high impact poly(para-methylstyrene).

4. The blend according to claim 1, wherein said compatibilizing agent is a hydrogenated butadiene diblock copolymer.

5. The blend according to claim 4, wherein said compatibilizing agent is a hydrogenated butadiene-styrene diblock copolymer.

6. The blend according to claim 5, wherein said compatibilizing agent is a hydrogenated butadiene-paramethylstyrene diblock copolymer.

7. The blend according to claim 1, wherein said compatibilizing agent is a hydrogenated isoprene diblock copolymer.

8. The blend according to claim 7, wherein said compatibilizing agent is a hydrogenated isoprene-styrene diblock copolymer.

9. The blend according to claim 8, wherein said compatibilizing agent is a hydrogenated isoprene-paramethylstyrene diblock copolymer.

10. The blend according to claim 1, wherein said compatibilizing agent is present in an amount between 2 and 5% by weight.

11. The blend according to claim 1, said blend having an Izod Notched ⅛" impact strength greater than 5 ft lb/in.

12. The blend according to claim 1, said blend having an Izod Notched ⅛" impact strength greater than 7 ft lb/in.

13. A method of preparing a polymer blend comprising from 10 to 50 percent by weight polyethylene, from 50 to 90 percent by weight poly(para-methylstyrene) and from 2 to 10 percent by weight of a hydrogenated diene diblock compatibilizing agent, said method comprising blending said polyethylene, poly(para-methylstyrene) and compatibilizing agent in the presence of heat.

14. The method according to claim 13, wherein said polyethylene, poly(para-methylstyrene) and compatibilizing agent are blended simultaneously.

15. The method according to claim 13, wherein said blending comprises the following steps:
    (1) combining said compatibilizing agent with said polyethylene to form a blended mixture; and
    (2) combining said poly(para-methylstyrene) with said blended mixture.

16. The method according to claim 15, wherein said compatibilizing agent is combined with said polyethylene at a temperature between 150° and 200° C.

17. The method according to claim 15, wherein said compatibilizing agent is combined with said polyethylene at a temperature of 160° C.

18. The method according to claim 15, wherein said poly(paramethylstyrene) is combined with said blended mixture at a temperature between 175° and 270° C.

19. The method according to claim 15, wherein said poly(paramethylstyrene) is combined with said blended mixture at a temperature of 200° C.

* * * * *